United States Patent [19]

Jamet et al.

[11] Patent Number: 4,525,337

[45] Date of Patent: * Jun. 25, 1985

[54] PROCESS FOR THE MANUFACTURE OF COMPACT COMPOSITE CARBONACEOUS MATERIALS BY DENSIFICATION OF POROUS CARBONACEOUS SUBSTRATES

[75] Inventors: Jean Jamet, Janvry; Jean-Jacques Poupeau, St-Remy-les-Chevreuse; Jacqueline Omnes, Paris; Claude Le Pennec, Vincennes, all of France

[73] Assignees: Commissariat a l'Energie Atomique, Paris; Office National d'Etudes et de Recherche Aerospatiales, Chatilcon, both of France

[*] Notice: The portion of the term of this patent subsequent to Apr. 30, 2002 has been disclaimed.

[21] Appl. No.: 477,487

[22] Filed: Mar. 21, 1983

Related U.S. Application Data

[63] Continuation-in-part of Ser. No. 244,877, Mar. 18, 1981, abandoned.

[30] Foreign Application Priority Data

Mar. 28, 1980 [FR] France ................. 80 07034
Sep. 18, 1980 [FR] France ................. 80 20089

[51] Int. Cl.³ ............... C01B 31/04; C01B 31/02
[52] U.S. Cl. .................. 423/449; 423/445; 423/448; 264/29.5
[58] Field of Search ............ 423/445, 448, 449; 264/29.1, 29.3, 29.5

[56] References Cited

U.S. PATENT DOCUMENTS

| B 414,028 | 2/1976 | Overholser et al. | 423/445 |
| 3,246,056 | 4/1966 | Shea, Jr. et al. | 264/29.1 |
| 3,249,964 | 5/1966 | Shalter | 264/29.1 |
| 3,419,645 | 12/1968 | Yietzka et al. | 264/29.5 |
| 3,517,092 | 6/1970 | Peterson | 264/29.5 |
| 4,178,413 | 12/1979 | De Munda | 264/29.5 |
| 4,215,161 | 6/1980 | Seibold et al. | 264/29.5 |
| 4,226,900 | 10/1980 | Carlson | 264/29.5 |

FOREIGN PATENT DOCUMENTS 1335127 10/1973 United Kingdom ............ 423/448

OTHER PUBLICATIONS

Chard et al., Advanced High Pressure Graphite Processing, Graphite Processing Technology ACS Symposium Serials #21, Chapter 14, 1974, pp. 155-171.

Primary Examiner—Gary P. Straub
Attorney, Agent, or Firm—Oblon, Fisher, Spivak, McClelland & Maier

[57] ABSTRACT

A method for the high temperature, high pressure impregnation of thick woven carbon substrates with pitches to form carbon impregnated carbon bodies. The use of pitch with high (about 30%) levels of free carbon as the impregnating pitch reduces the number of cycles to obtain a product of given density as compared to carbon free pitch. The impregnation is conducted in hydrogen permeable aneroid vessels.

3 Claims, 4 Drawing Figures

PROCESS FOR THE MANUFACTURE OF COMPACT COMPOSITE CARBONACEOUS MATERIALS BY DENSIFICATION OF POROUS CARBONACEOUS SUBSTRATES

BACKGROUND OF THE INVENTION

The present specification is a continuation-in-part application of U.S. application Ser. No. 244,877, filed on Mar. 18, 1981 in the name of the present applicants now abandoned.

The present invention relates to the manufacture of compact composite carbonaceous materials by densification of porous carbonaceous substrates, the latter being obtained through the decomposition of hydrocarbon products, particularly pitches, at high temperature and under high pressure.

The term "densification" is understood to mean an operation consisting of applying carbon to a porous carbonation substrate and the word is used in this sense throughout the remainder of the description.

However, the invention specifically relates to the densification of carbonaceous substrates formed by the weaving of continuous carbon fibres organized in such a way as to form a fibrous reinforcing structure for the composite material and having very small pores, in which the fibres are oriented according to at least three principal directions of space.

The latest technology for producing compact carbonaceous materials, such as e.g. carbon—carbon composite materials, preferably uses pitches under high pressure. The latter are essentially constituted by carbon and hydrogen having a softening point of approximately 70° to 100° C. Beyond this level they liquefy and remain stable up to approximately 350° to 400° C., as from which they start to decompose with the release of hydrogen and volatile saturated hydrocarbons, whilst a mesophase forms in the liquid mass. The latter is in the form of small spheres similar to liquid crystals, which increase in size and which, by coalescence, invade the entire liquid phase. Once the reaction is at an end, the substance to be densified undergoes a graphitization treatment at about 2,600° C. and the cycle is recommenced until the desired density is obtained.

In order to increase the carbon yields, this conversion is carried out in reactors formed by crimped metal capsules and under a high pressure.

As the capsules used up to now had only a very limited permeability, the gases produced during the reaction were able to bring about a nucleation within the substance, said nucleation displacing towards the walls and ultimately giving a certain porosity to the product obtained. Moreover, the number of cycles necessary for obtaining the end product of given density can vary.

It is for this reason that processes have been recently developed, which use capsules having walls made from a hydrogen-permeable material, an example of which is provided by the process described in French Pat. No. 2 096 144.

Thus, the elimination of hydrogen during its production aids both the decomposition of the hydrocarbon substance and that of the volatile hydrocarbons. This leads to an improvement in the efficiency of the decomposition reactions, by reducing the porous volume caused by the formation of gaseous nucleations within the substance. This leads to a reduction in production costs, by reducing the number of cycles necessary, whilst obtaining a more homogeneous product.

In addition, the walls of the presently used capsules have an adequate flexibility to permit working under high pressure. This makes it possible to further increase the efficiency of the reactions, by making it possible to work under very high pressures, without any risks of the reactor fracturing, because the external pressure is constantly balanced by that of the incompressible liquid mass contained therein.

In general terms, the aforementioned process is applicable to the manufacture of composite materials having a limited thickness. It only applies to the manufacture of thick composite materials, when the fibrous reinforcement is nonwoven, is e.g. formed from short fibres (i.e. whose length does not exceed a few cm) placed loose in a container containing pitch, the mixture being successively mixed, compacted and then converted into carbon. When it is a question of producing thick structures, i.e. having a thickness greater than 20 mm, densification can be carried out layer by layer by winding long fibres and depositing between each layer, a pitch or other hydrocarbon substance to be decomposed. This amounts to carrying out several consecutive densifications on elements of limited thickness, which makes the production of the composite material long and consequently costly. For example, British Pat. No. 1,335,127 describes the densification of fibrous structures comprising either short fibres mixed with the substance to be decomposed and then compacted, or fibres wound in successive layers between which the substance is applied by atomization, or wound fibres, which undergo flocking.

In addition, the composite products obtained have good mechanical properties, but lack cohesion, particularly due to the manner in which their fibrous reinforcements are made.

SUMMARY OF THE INVENTION

The object of the present invention is to obviate these disadvantages by means of a process for densifying porous carbonaceous substrates, making it possible to directly carry out the densification of thick, large structures. According to the invention, composite materials with high mechanical performances are obtained on the basis of thick carbonaceous fibrous structures having very small pores, formed by the multidirectional weaving of continuous carbon fibres oriented in accordance with at least three principal directions of space and by the decomposition of a hydrocarbon substance injected into the structure, said hydrocarbon substance chosen from among the group of pitches containing free carbon, such as coal tar, containing approximately 30% of free carbon.

More specifically the present invention relates to a process for the accelerated densification of a porous carbonaceous substrate comprising decomposing a hydrocarbon substance in the presence of said substrate under high pressure at a high temperature, the decomposition taking place in the liquid phase within a closed reactor, said decomposition leading to the production of hydrogen, the reactor having walls permitting an elimination of the hydrogen given off during the decomposition as production takes place, the walls of said reactor having the flexibility necessary to ensure that the internal volume thereof at all times adapts under the effect of the pressure applied to the volume of the liquid phase contained therein, wherein the porous carbonaceous substrate is a structure having a thickness exceeding 20 mm, formed by the multidirectional weaving of continuous carbon fibres, oriented according to at least three principal directions of space, and wherein the hydrocarbon substance contains free carbon.

One of the difficulties of performing the process results from the fact that the coal tars contain free carbon ($\alpha$ phase), in variable proportions, i.e. colloidal or non-colloidal carbon particles. Although their presence is favourable for the densification stage, it can be prejudicial on carrying out a graphitization of the product obtained or when the structure to be densified is thick and large. Thus, the free carbon prevents the coalescence of the mesophase spheres and has a retarding effect during the graphitization stage.

In addition, free carbon has hitherto been considered to have another disadvantage. Thus, fibrous substances in the form of thick structures woven in accordance with at least three directions and having very small pores form filters for solid suspensions, even when the particles of these suspensions are very fine. Thus, under the normal temperature and pressure conditions used in this procedure, clogging occurs to the walls of the substrate as from the start of impregnation. For this reason the experts have always avoided the use of pitches containing free carbon. Even though as yet no attempt has been made to densify thick structures, the present state of the art leads to the use of pitches containing no free carbon, due to the aforementioned clogging problem.

However, the inventors have demonstrated that, contrary to what was generally accepted, it is possible to use pitches or other hydrocarbon substances containing a large amount of free carbon, provided that a sufficiently high pressure is used (700 to 1000 bars) to prevent the clogging phenemenon.

It has also been found that in the prior art carbon—carbon composite products of exceptional quality were not particularly sought, in that said materials were particularly used for producing electrodes and the fibrous frames or armatures available would not have supported the stresses due to an excessively high pressure.

The fact that substances containing free carbon and more particularly coal tar make it possible to obtain products having excellent mechanical properties is due to an extremely fine granular structure (absence of coalescence of the mesophase) and a perfect adhesiveness to the fibrous substrate is due to the considerable wettability of the highly aromatic coal tars.

Thus, substances containing free carbon can be used with advantage on seeking excellent mechanical qualities and not a perfect graphitization.

According to a feature of the process according to the invention, the substance to be decomposed is a coal tar containing 30% free carbon, with an atomic C/H ratio higher than 1.4 and having a softening point at 90° C. According to another feature of this process, the substance to be decomposed is injected in the liquid state into the porous substrate at a temperature between 130° and 250° C. and under a pressure between 0.006 and 1 bar.

Finally, the invention also relates to a carbon—carbon composite product obtained by the aforementioned process. This product is in the form of a thick multidirectional structure constituted by a group of carbon fibres woven in accordance with a finite number of given directions, said fibres being continuous and having a diameter between 6 and 8 $\mu$m, and into which has been incorporated carbon resulting from the decomposition of a hydrocarbon substance, the volume relation of the fibres in the end product being between 30 and 50%.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

For testing purposes, densification was carried out of a parallelepipedic substrate of dimensions 250×250×650 mm, constituted by a system of fibres woven in three orthogonal directions in space, so as to form groups of parallel fibres. The distribution of the fibres can either be chosen so as to obtain an isotropic resistance of the substrate, or in order to favour certain particular directions.

In the example described here, the fibres are continuous carbon fibres of diameter 7 mm arranged in the form of strands, the number of fibres constituting a strand being approximately 3000. This leads to a porous structure with a volume relation of the fibres of approximately 50%.

The structure to be densified has interstices between the fibres and the hydrocarbon substance to be decomposed penetrates said interstices.

This structure has been densified with a coal tar containing 30% free carbon, with a softening point of 90% and an atomic ratio C/H equal to 1.89. In most cases, it is advantageous to use a tar with an atomic ratio C/H exceeding 1.4 and preferably between 1.4 and 1.9. In addition, coal tars are inexpensive products, which are readily available and have a good carbon yield. Thus, they are particularly suitable for this particular application.

Figure 1:
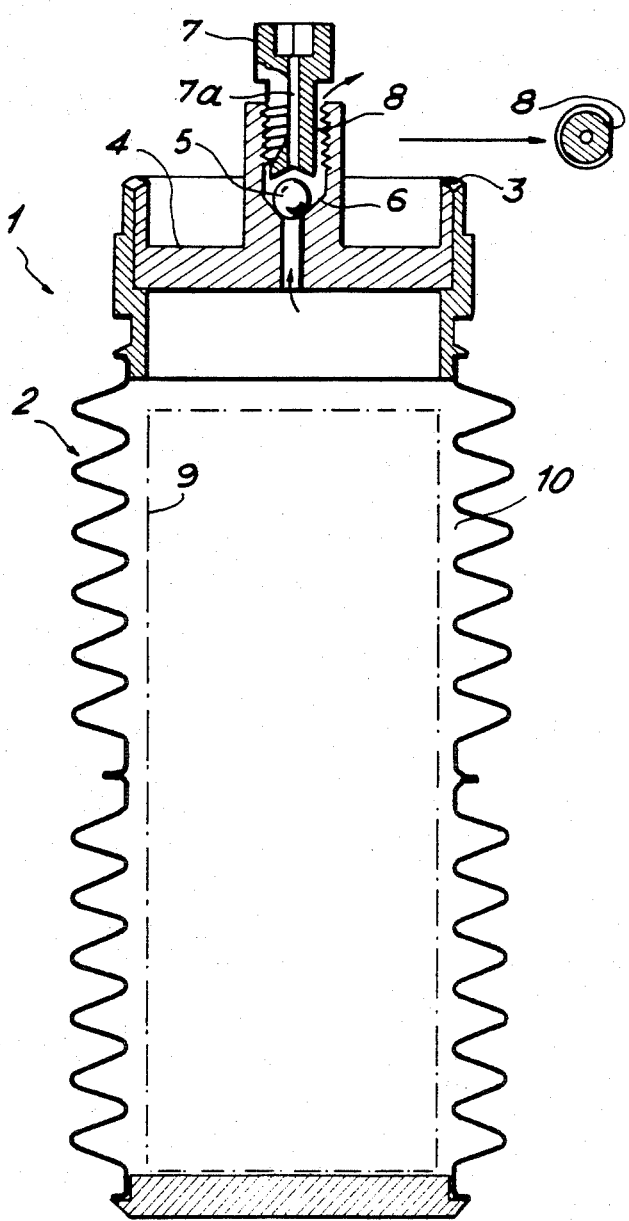
FIG. 1 a sectional view of an aneroid capsule used for performing the process according to the invention.

FIG. 1 shows an aneroid capsule 1 with thin, undulated or corrugated walls 2 used for performing the process according to the invention. This shape makes it possible to considerably increase the surface/thickness ratio of the capsule walls, making the same more permeable to hydrogen, obviously provided that the material forming the capsule permits the diffusion of this gas. In known manner, a good permeability is obtained by selecting as the material for forming the capsule, a metal such as nickel or stainless steel. If the economic standpoint is not vital, it is also possible to use other materials such as palladium or an alloy, e.g. of palladium and silver.

FIG. 1 also shows the closure means 3 constituted by a cover 4, welded to capsule 1, sealing being provided by means of the ball 5, which is applied to cone 6 by means of screw 7, the latter having a flat 8, enabling a vacuum to be formed. This operation is also facilitated by the central hole 7a traversing screw 7.

The process is performed in the following way. Firstly the carbonaceous structure or porous substrate to be densified is placed in the unsealed capsule 1, which is then placed in an enclosure, where a vacuum is formed. The capsule is then filled with previously liquefied tar 10, the residual pressure in the enclosure being approximately 5 to 10 mm Hg. To ensure that the tar penetrates the substrate, it is necessary to carry out this operation under a vacuum and to leave the liquid tar in contact with the substrate for an adequate time. Cooling is then allowed to take place and atmospheric pressure is restored.

The process, essentially used for densifying carbon—carbon composite products, can naturally apply to other substances and the initial carbonaceous substrate can either be a carbon fibre frame, or a random carbon product, whereof the density is to be increased.

Figure 2:
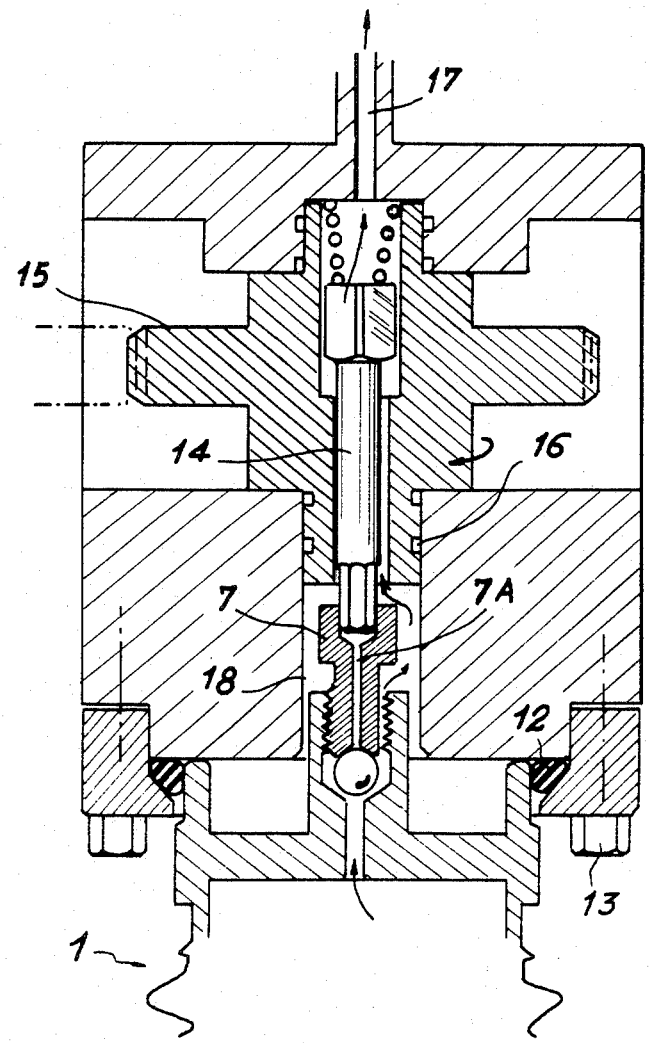
FIG. 2 a sectional view of the device for placing the capsule of FIG. 1 under a vacuum.

Cover 4 is then welded to capsule 1 and the vacuum is formed by the system shown in FIG. 2. A cap 11 is positioned in the upper part of capsule 1, the seal being ensured by the joint 12, held in place by screws 13. Moreover, screw 7 is tightened by means of a telescopic spanner 14, which is manipulated by control system 15. The seal between the latter and cap 11 is provided by joints 16. A pipe 17 connected to a not shown vacuum pump traverses system 15.

When the vacuum has been produced in capsule 1 and in the internal space 18 of cap 11, control system 15 is put into operation and screw 7 is tightened to lock ball 5 on cone 6. A small empty space is left in the upper part of the capsule, the residual pressure also being approximately 5 to 10 mm Hg.

The device for producing the vacuum is then removed, and the capsule is placed in a high pressure enclosure, which is heated at 200° C. A range limit must be respected in order to ensure that the tar is well melted.

The temperature is then progressively raised to about 600° to 700° C., whilst the capsule is exposed to a high argon pressure (approximately 700 to 1000 bars). Under the effect of this pressure, the capsule is squeezed, which eliminates the previously produced empty space. The interior of the capsule is then entirely filled with the liquid phase. The considerable flexibility of the aneroid capsule makes it possible to work at very high pressures (e.g. up to 2000 bars, if the installation permits this) without any risk of the capsule fracturing, because the external pressure is always balanced by that of the liquid contained therein. Argon scavenging is necessary to extract the hydrogen from the enclosure, in order that the partial pressure of the latter externally of the capsule is as low as possible. The continuous analysis of the gases leaving the high pressure enclosure gives details of the hydrogen flow at all times.

Figure 3:
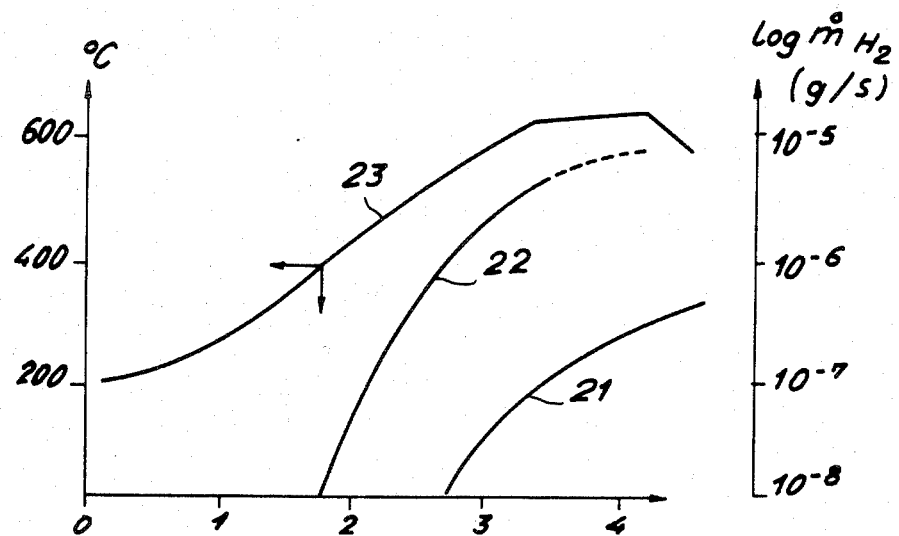
FIG. 3 in logarithmic scale, the curves giving the hydrogen gas flow (in grammes/second) as a function of time (in hours) for two types of capsule.

This is shown in logarithmic scale and in grammes/-second, as a function of the time in hours and the temperature rise in FIG. 3 for two types of capsule having the same volume, permitting a capsule between a straight capsule with smooth walls and made from stainless steel (curve 21) and an aneroid capsule with thin, undulated walls and made from nickel (curve 22). It is also possible to see the evolution of the temperature as a function of time (curve 23).

It is apparent from FIG. 3, that the nickel aneroid capsule considerably increases the efficiency of the reaction compared with the stainless steel capsule. With the former, the hydrogen diffusion commences much earlier and as soon as the temperature reaches a value close to 400° C., at which the tar starts to decompose. However, with the latter nothing takes place below 500° C. In addition, at a given time, the hydrogen flow rate is approximately 100 times higher with the nickel aneroid capsule than with the straight stainless steel capsule.

After approximately five hours, the hydrogen flow decreases considerably or stops and it is possible to extract the substrate from the capsule. The operations are then recommenced, by repeating the cycle the same number of times as is necessary to obtain the final desired density.

Figure 4:
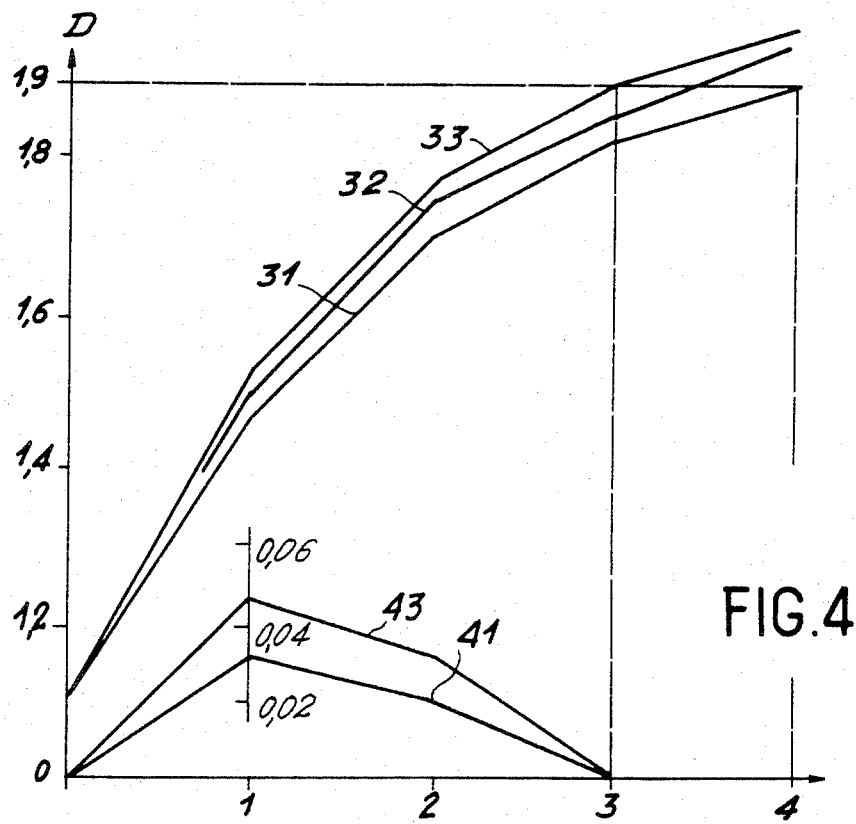
FIG. 4 the curves giving the increase in the density of the substrate after each cycle, for three different capsule types.

FIG. 4 indicates the density of the product obtained after each densification cycle for the same substrate of initial density 1.12 with three types of capsule:
  straight stainless steel capsule (curve 31) according to the prior art;
  stainless steel aneroid capsule (curve 32);
  nickel aneroid capsule (curve 33).

It is clear that for the same starting product, the nickel aneroid capsule makes it possible to obtain a final density of 1.90 after three cycles, whereas four cycles are required with the straight stainless steel capsule.

Moreover, the comparison of curves 31 and 32 shows that for a same constituent material of the capsule, the improvement provided by the structure with the thin, undulated walls, compared with the structure having smooth walls.

Comparison of curves 32 and 33 shows that, for the same capsule structure, nickel is more effective than stainless steel.

Curves 41 and 43 show the density improvement for each cycle with the straight stainless steel capsule and the nickel aneroid capsule respectively.

These curves show that after the first cycle, the increase in density is much greater with the nickel aneroid capsule (curve 43) than with the straight stainless steel capsule (curve 41). During the following cycles, the density gain decreases and is finally cancelled out when the substrate reaches its maximum density.

The elimination of the hydrogen can also take place by internal trapping using a titanium sponge or palladium black, two materials in which hydrogen has a considerable solubility.

Other reactor forms are also possible and it is possible to envisage flat, circular capsules with undulated walls, of the type used in aneroid barometers.

In addition, reference has been made in exemplified maner to the use of coal tar for densifying the fibrous substrate, but it would not fall outside the scope of the invention to use other equivalent hydrocarbon substances containing free carbon.

There are numerous, varied applications, particularly in connection with the manufacture of compact carbonaceous materials of any random shape and dimensions. The latter and in particular carbon—carbon composite products are virtually the only ones usable in fields where a high mechanical strength and a high resistance to abrasion at high temperatures are required. In exemplified manner, reference is made to the manufacture of electrodes, car or aircraft brakes, as well as medical prostheses, because carbon is compatible with living tissues.

What is claimed is:

1. A process for the accelerated densification of a porous carbonaceous substrate comprising decomposing a hydrocarbon substance having a free carbon content of about 30% in the presence of said substrate under high pressure at a high temperature, wherein said decomposition is effected in a liquid phase within a closed reactor and results in the production of hydrogen, and wherein the reactor in which said densification occurs has walls which have a flexibility sufficient to ensure that the internal volume of said reactor adapts, under the effect of the applied pressure, to the volume of the liquid phase contained therein, and wherein said porous carbonaceous substrate has a thickness exceeding 20 mm, and is formed by the multidirectional weaving of continuous carbon fibers which are oriented according to at least three principal direction of space.

2. The process according to claim 1, wherein the substance to be decomposed is a coal tar, with an atomic ratio C/H above 1.4 and with a softening point of 90° C.

3. The process according to claim 1, wherein the substance to be decomposed is injected in the liquid state into the porous substrate at a temperature between 130° and 250° C. and under a pressure between 0.006 and 1 bar.

* * * * *